United States Patent [19]

Leifholtz et al.

[11] Patent Number: 5,328,936

[45] Date of Patent: Jul. 12, 1994

[54] POLYMERIZATION PROCESS FOR MAKING POROUS POLYMERIC PARTICLES

[75] Inventors: Paul J. Leifholtz, Bensalem; Thomas E. Meteyer, Gwynedd Valley, both of Pa.

[73] Assignee: Rohm and Haas Company, Philadelphia, Pa.

[21] Appl. No.: 12,082

[22] Filed: Feb. 1, 1993

[51] Int. Cl.$^5$ .......................... C08J 9/28; C08F 2/20; C08F 8/36

[52] U.S. Cl. ......................... 521/65; 521/32; 521/33; 521/38; 521/62; 521/64; 521/72; 526/173; 526/178; 526/181; 526/201; 526/208; 526/210; 526/232.1; 526/278; 526/336; 526/340; 526/340.1; 526/340.3; 526/347; 526/347.1; 526/910; 526/911

[58] Field of Search ...................... 521/62, 38, 33, 32, 521/64, 65; 526/210, 201

[56] References Cited

U.S. PATENT DOCUMENTS

| | | | |
|---|---|---|---|
| 3,357,158 | 12/1967 | Hollis | 521/62 |
| 3,367,889 | 2/1988 | Oline | 521/33 |
| 3,976,629 | 8/1976 | Hayward | 521/29 |
| 4,052,343 | 10/1977 | Cunningham | 521/32 |
| 4,191,812 | 3/1980 | Chong | 521/28 |
| 4,256,840 | 3/1981 | Meitzner | 521/33 |
| 4,382,124 | 5/1983 | Meitzner et al. | 521/38 |
| 4,972,000 | 11/1990 | Kawashima | 521/54 |

FOREIGN PATENT DOCUMENTS 1137554  6/1961  Fed. Rep. of Germany.

*Primary Examiner*—Fred Zitomer
*Attorney, Agent, or Firm*—John E. Taylor, III; Kevin E. McVeigh

[57] ABSTRACT

A process for making porous polymeric particles having high surface area includes suspending a discontinuous organic phase in an continuous aqueous phase, wherein the organic phase includes an ethylenically unsaturated monomer, a water soluble phase extender and a surfactant in an amount effective to solubilize the water soluble phase extender in the monomer and wherein the aqueous phase includes a diffusion barrier agent for limiting mass transfer of the phase extender from the organic phase to the aqueous phase, and then polymerizing the ethylenically unsaturated monomer to form the porous polymeric particles.

27 Claims, No Drawings

POLYMERIZATION PROCESS FOR MAKING POROUS POLYMERIC PARTICLES

TECHNICAL FIELD

The present invention relates to polymerization processes and more particularly to suspension polymerization processes for making porous polymer particles.

BACKGROUND

Porous polymeric particles having high surface area have been prepared by suspension polymerization wherein discontinuous organic phase, i.e., droplets of monomeric reaction mixture, are suspended in a continuous aqueous phase and a "phase extender", i.e., a nonreactive low molecular weight diluent is included in the monomeric reaction mixture. Organic solvents, e.g., xylene, that are soluble in the reaction mixture and insoluble in the continuous aqueous phase, are typically used as phase extenders. The suspended droplets of the reaction mixture are polymerized and the phase extender is then removed from the polymerized particles, e.g., by distillation, and recycled. The process of removing the phase extender from the particles can be tedious, time consuming and expensive.

German Patent Application DE 1137 554 discloses a process wherein an inverted emulsion of water in a water insoluble monomer is dispersed in an aqueous medium and the monomer is polymerized to produce a porous polymer having an elevated softening point compared to a polymer of the same monomer prepared by conventional suspension polymerization processes. The polymers disclosed in the German application are not characterized with regard to surface area.

SUMMARY OF THE INVENTION

A suspension polymerization process for making porous polymeric particles using a water soluble phase extender is disclosed. The process includes suspending a discontinuous organic phase in a continuous aqueous phase. The organic phase comprises an ethylenically unsaturated monomer, a water soluble phase extender and a surfactant in an amount effective to solubilize the water soluble phase extender in the monomer. The aqueous phase comprises a diffusion barrier agent, dispersed in the aqueous phase, for limiting mass transfer of the water soluble phase extender from the organic phase into the aqueous phase. The monomer is then polymerized to from the porous polymeric particles. The water soluble phase extender, surfactant and diffusion barrier agent are then removed from the polymer particles by washing the particles in water. The washed particles are then dried.

In a preferred embodiment, the aqueous phase includes an anti-emulsion agent dissolved in the aqueous phase for limiting interaction between the surfactant and the aqueous phase.

In a preferred embodiment, the ethylenically unsaturated monomer comprises a mixture of divinylbenzene and styrene.

In a preferred embodiment, the surfactant comprises a sodium dialkyl sulfosuccinate or a polymeric phosphate ester.

In a preferred embodiment, the water soluble phase extender is selected from the group consisting of water, lower alcohols and acetone.

In a highly preferred embodiment, the diffusion barrier agent comprises finely divided hydrophobic particles.

In a highly preferred embodiment, the anti-emulsion agent comprises a metal salt.

DETAILED DESCRIPTION OF THE INVENTION AND BEST MODE

The ethylenically unsaturated monomer of the present invention may be any monoethylenically unsaturated monomer or polyethylenically unsaturated monomer. As used herein, the term "monoethylenically unsaturated monomer" means a monomer having one ethylenically unsaturated site, i.e., $CH_2=CH-$, per molecule of the monomer and "polyethylenically unsaturated monomer" means a monomer having two or more ethylenically unsaturated sites per molecule of the monomer.

Suitable monoethylenically unsaturated monomers include, e.g., styrene, ethylvinylbenzene, vinyltoluene, vinylnaphthalene, vinylpyridine, (meth)acrylic acid, methyl(meth)acrylate, butyl(meth)acrylate, cyclohexyl(meth)acrylate and isobutyl(meth)acrylate, wherein the terminology "(meth)acrylic" and "(meth)acrylate" indicate that the acrylic compound or acrylate compound and its respective methacrylic or methacrylate analog may, for the purposes of the present invention, be used interchangeably in the context wherein that terminology is used. Preferably, the monoethylenically unsaturated monomer is styrene or ethylvinylbenzene.

Suitable polyethylenically unsaturated monomers include, e.g., divinylbenzene, divinyltoluene, divinylxylene, divinylnaphthalene, divinylphthalate, divinylmaleate, divinylsuccinate, N,N'methylenediacrylamide, trivinylbenzene, trivinylnaphthalate. Divinyl benzene is preferred as the polyethylenically unsaturated monomer of the present invention.

Preferably, the organic phase includes a mixture of monoethylenically unsaturated monomer and polyethylenically unsaturated monomer. In general, increasing the relative amount of polyethylenically unsaturated monomer tends to increase particle surface area. Preferably, the monomeric portion of the organic phase includes from about 5 parts by weight (pbw) to about 50 pbw monoethylenically unsaturated monomer per 100 pbw polyethylenically unsaturated monomer. Most preferably, the monomeric portion of the organic phase includes from about 10 pbw to about 30 pbw monoethylenically unsaturated monomer per 100 pbw polyethylenically unsaturated monomer.

Suitable polymerization initiators include any compound which is soluble in the organic phase and which dissociates upon heating to yield a free radical. Suitable polymerization initiator compounds include, e.g., peroxidic compounds such as benzoyl peroxide, alkylhydroperoxides and t-butylperbenzoate, and azo compounds such as azobis(2,2-dimethylvaleronitrate) and azobis(isobutylronitrile). Benzoyl peroxide is the preferred polymerization initiator for use in the present invention. The amount of initiator may be any amount effective to initiate polymerization, e.g., from about 0.1 pbw to about 1.5 pbw initiator per 100 parts monomer.

The organic phase includes a water soluble phase extender that is inert with respect to the ethylenically unsaturated monomer of the organic phase and which, subsequent to polymerization of the monomers to form polymeric particles, may be removed from the particles to provide a network of pores within the particles. Suitable water soluble phase extenders include, e.g. water, lower alcohols, i.e., alcohols having from 1 to 4 carbon atoms per molecule, acetone and mixtures thereof.

The relative amount of water soluble phase extender included in the organic phase ranges from about 5 to pbw to about 50 pbw water soluble phase extender per 100 pbw ethylenically unsaturated monomer. Preferably, the organic phase includes from about 5 pbw to about 20 pbw water soluble phase extender per 100 pbw ethylenically unsaturated monomer.

Surfactants suitable for use in the process of the present invention are those which are able to solubilize the water soluble phase extender of the present invention in the ethylenically unsaturated monomer of the organic phase. In the context of the present invention, the water soluble phase extender is "solubilized" in the monomer when, upon visual inspection, the combined monomer, phase extender and surfactant appear to form a substantially clear homogeneous single phase, wherein the terminology "substantially clear" is to be interpreted as permitting a slightly hazy or slightly turbid appearance. Preferably, the combined monomer, phase extender and surfactant from a clear, i.e., having no apparent haziness, homogeneous solution. Suitable surfactants include, e.g., sodium dioctyl sulfosuccinate and polymeric phosphate esters such as octylphenoxypolyethoxyethylphosphate. Sodium dioctyl sulfosuccinate is preferred as the surfactant of the present invention.

The amount of surfactant used is dependent upon the amount of water soluble phase extender included in the organic phase and may range from about 10 pbw to about 40 pbw surfactant per 100 pbw phase extender. Preferably, the organic phase includes from about 15 pbw to about 30 pbw surfactant per 100 pbw phase extender.

A diffusion barrier agent for limiting mass transfer of the water soluble phase extender from the organic phase into the aqueous phase is dispersed in the aqueous phase.

The diffusion barrier agent may be any compound which serves to limit mass transfer of the phase extender from the organic phase into the aqueous phase. Suitable diffusion barrier agents include finely divided, e.g., having a particle size less than or equal to about 200 mesh, hydrophobic compounds, e.g., particles of clay, particles of crosslinked hydrophobic organic resins, which are substantially inert to the polymerization reaction of the present process, which are not soluble in the organic phase, which may be dispersed in the aqueous phase and which form a diffusion barrier at the interfaces between the suspended organic droplets and the continuous aqueous phase. Hydrophobic compounds suitable as the diffusion barrier agent of the present invention include, e.g., finely divided crosslinked hydrophobic organic resins such as the the styrene-divinylbenzene emulsion copolymer disclosed in U.S. Pat. No. 4,191,812, and finely divided bentonite clays. As used herein the terminology "bentonite clays" means members of the montmorilonite group of minerals such as montmorillonite, beidellite, nontronite, hectorite, saponite and sauconite. Hectorite is preferred as the diffusion barrier in the process of the present invention. Hectorite is a magnesium silicate having a typical composition of $(Mg_{2.67}Li_{0.33}(Na_{0.33})Si_4)O_{10}(OH)_2$, wherein $(Na_{0.33})$ is given as an exchangeable ion following the ion, i.e., $(Li_{0.33})$, it may replace.

The amount of diffusion barrier agent dispersed in the aqueous phase may be any effective amount, e.g., the aqueous phase may include from about 0.1 pbw to about 5 pbw diffusion barrier agent per 100 pbw water. Preferably, the aqueous phase includes from about 0.4 pbw to about 3 pbw diffusion barrier agent per 100 pbw water.

Preferably, an anti-emulsion agent for limiting association of surfactant with the continuous aqueous phase is dissolved in the aqueous phase of the process of the present invention.

The anti-emulsion agent may be any compound that limits association of the surfactant of the discontinuous organic phase with the continuous aqueous phase. Suitable an anti-emulsion agents include, e.g., compounds which are inert with respect to the solution polymerization reaction of the process of the present invention and which may be dissolved in the aqueous phase to decrease the driving forces, i.e., the affinity of the hydrophilic portion of the surfactant for the continuous aqueous phase, for association of the surfactant with the continuous aqueous phase. Metal salts, e.g., NaCl, KCl, and $Na_2SO_4$, are preferred as the anti-emulsion agent of the process and the present invention, with NaCl being particularly preferred.

The amount of anti-emulsion agent dissolved in the aqueous phase may be any amount effective to reduce association of the surfactant with the continuous aqueous phase, e.g., up to about 40 pbw anti-emulsion agent per 100 pbw aqueous phase.

In a highly preferred embodiment, the continuous aqueous phase of the process of the present invention includes from about 0.4 pbw to about 3 pbw diffusion barrier agent and from about 20 pbw to about 40 pbw anti-emulsion agent per 100 pbw water.

Optionally, conventional solution polymerization suspending agents, e.g., water soluble polymers such as cellulose esters, e.g., carboxymethylmethylcellulose, may also be included in the aqueous phase to adjust the viscosity of the aqueous phase.

The organic phase is prepared by mixing the selected ethylenically unsaturated monomers, if a mixture of monomers is to be used, and then dissolving the surfactant in the ethylenically unsaturated monomer or mixture of monomers. The phase extender is then added to the solution of monomer and surfactant and mixed thoroughly to provide a substantially clear homogenous single phase. The polymerization initiator may be added at any convenient point, i.e. by adding to the initial monomer charge, to the solution of monomer and surfactant or to the combined monomer, surfactant and phase extender.

The aqueous organic phase is prepared by dispersing the diffusion barrier agent and dissolving the anti-emulsion agent in a volume of water in any convenient manner.

The suspending and polymerizing steps of the process of the present invention may then proceed substantially according to conventional suspension polymerization techniques.

The organic phase is added to the aqueous phase while stirring the aqueous phase and the combined organic and aqueous phases are mixed for a period of time effective to establish a discontinuous organic phase suspended in a continuous aqueous phase.

Preferably, the combined organic and aqueous phases comprise from about 0.25 parts by volume (pbv) to about 1.3 pbv organic phase per 1 pbv aqueous phase.

The combined organic and aqueous phases are heated while stirring to a selected reaction temperature, e.g., from about 60° C. to about 90° C., selected on the basis of the relationship between rate of disassociation of the polymerization initiator with temperature, and maintained at the reaction temperature, while stirring, for a period of time effective to allow formation of polymeric particles and to drive the polymerization reaction as close to completion as practical, e.g., from about 2 hours to about 20 hours.

The polymeric particles are separated from the aqueous phase, washed in warm, e.g., 50° C., water to remove the surfactant and then dried to provide the porous polymeric particles of the present invention.

The process of the present invention allows formation of porous polymeric particles having high surface area, e.g., a BET surface area greater than about 50 $m^2/g$. In a preferred embodiment, the particles exhibit a surface area greater than about 100 $m^2/g$, more preferably, greater than about 200 $m^2/g$, and most preferably, greater than about 300 $m^2/g$.

The porous polymeric particles produced by the process of the present invention are useful as adsorbents and may be functionalized to produce ion exchange resins.

EXAMPLE 1

An organic phase was prepared by dissolving 18.0 grams of a surfactant (sodium dioctylsulfosuccinate, Aerosol AOT, American Cyanamid Co.) in 100 grams of a mixture ethylenically unsaturated monomers (80 weight % divinylbenzene and 20 weight % ethylvinyl benzene), adding 9.0 grams of water soluble phase extender (deionized water) to the solution and stirring for 15 minutes and subsequently adding 1.0 grams of a polymerization initiator (benzoyl peroxide) and stirring until the initiator had dissolved.

An aqueous phase was prepared by dissolving 182.0 grams of an anti-emulsion agent (sodium chloride) in 350 grams water, suspending 2.7 grams of a magnesium silicate clay diffusion barrier agent (Hectorite 200 Mesh, N & L Industries, Heightstown, N.J.) in 150 grams of warm (40° C.) water and combining the salt solution and the clay suspension.

The aqueous phase was charged to a reaction flask and stirred with a "C"-shaped mixing blade at 100 rpm. The organic phase was added to the stirring aqueous phase and stirring was continued for 10 minutes.

The combined organic and aqueous phase were then heated to 80° C. over a 30 minute period of time. Upon reaching 80° C., the stirring was increased to 125 rpm. The combined organic and aqueous phases were maintained at 80° C. while stirring at 125 rpm for a time period of 10 hours.

The reaction mixture was cooled to room temperature and granular product was washed with three 500 ml portions of warm (50° C.) water to remove the surfactant.

The process yielded 147 grams of off-white granules.

EXAMPLES 2 AND 3

In Examples 2 and 3 porous polymeric particles were made by a process substantially identical to that set forth in Example 3, except that:

in Example 2, methanol was substituted for water as the phase extender; and in Example 3, acetone was substituted for water as the phase extender.

EXAMPLE 4

In Example 4, porous polymeric particles were made by a process substantially identical to that set forth in Example 1, except that 0.06 wt % of a conventional suspending agent (carboxymethylmethylcellulose, Culminal CMMC 2000, Henkel Corp.) was also included in the aqueous phase.

EXAMPLES 5 AND 6

In Examples 5 and 6 porous particulate particles were made by a process substantially identical to that set forth in Example 1, except that:

the anti-emulsion agent was omitted from the aqueous phase; octylphenoxypolyethoxyethylphosphate (Triton QS-44, Rohm and Haas Company, Philadelphia, Pa.) was substituted for sodium dioctylsulfonate as the surfactant; and in Example C3, 7 wt % water (rather than 15 wt % water as in Example 1) was included in the organic phase as the water soluble phase extender.

EXAMPLE 7

The polymeric particles of Example 7 were made by the method set forth above in Example 1, except that particles of a hydrophobic styrene-divinylbenzene resin corresponding to the resin set forth in Example 5 of U.S. Pat. No. 4,191,812 was substituted for the magnesium silicate clay as the diffusion barrier agent.

EXAMPLE C1

In Example C1, porous polymeric particles were made by a process substantially identical to that set forth in Example 1, except that:

the diffusion barrier agent was omitted from the aqueous phase; and 0.08 wt % of a conventional suspending agent (carboxymethyl-methylcellulose, Culminal CMMC 2000, Henkel Corp. Water Soluble Polymers Division, Minneapolis, Minn.) was included in the aqueous phase.

EXAMPLES C2, C3 AND C4

In Examples C2, C3 and C4, the organic phase included 76.9 wt. % monomer (9.1 wt % divinylbenzene and 90.0 wt % styrene), 15.4 wt % surfactant (sodium dioctylsulfosuccinate, Aerosol AOT, American Cyanamid Co.) and 7.7 wt % water and polymerization reactions were carried out substantially according to the method set forth in Example 1, except that:

in Example C2, no a diffusion barrier agent or an anti-emulsion agent was included in the aqueous phase;

in Example C3, no a diffusion barrier agent was used and NaCl (27 wt % of aqueous phase) was used as suspending agent; and in Example C4, no diffusion barrier agent was used and $Na_2SO_4$ was used as an anti-emulsion agent.

The BET surface area, expressed as square meters per gram ($m^2/g$), and the average pore diameter, expressed in Angstroms (Å), each measured by nitrogen porosimetry, for the products of several of the above described exemplary processes are set forth below in Table 1.

TABLE 1

| Example No. | BET Surface Area ($m^2/g$) | Ave. Pore Size (Å) |
|---|---|---|
| 1 | 300.9 | 50.4 |
| 2 | 203.3 | 66.6 |

TABLE 1-continued

| Example No. | BET Surface Area (m²/g) | Ave. Pore Size (Å) |
|---|---|---|
| 3 | 141.3 | — |
| 4 | 205.4 | 70.1 |
| 5 | 72 | 107.8 |
| 6 | 63 | — |
| 7 | 156.5 | — |
| C1 | 37.9 | — |
| C2 | 8.9 | 109.9 |
| C3 | 2.2 | 36.9 |
| C4 | 9.6 | 133.1 |

While not wishing to be bound by theory, it is believed that, in a suspension polymerization mixture including a discontinuous organic phase comprising monomer, initiator, water soluble phase extender and surfactant dispersed in a continuous aqueous phase, there are strong driving forces urging migration of the water soluble phase extender from the organic phase droplets into the continuous aqueous phase and for the surfactant of the organic phase droplets to associate with the continuous aqueous phase and simply emulsify the organic and aqueous phases. The porosity of particles formed by polymerizing the organic phase of such a system appears to depend on the relationship between the polymerization reaction rate, the rate of phase extender migration, from the organic phase to the aqueous phase and the rate at which the surfactant becomes associated with the aqueous phase. When the rate of phase extender migration and the rate of association of the surfactant with the aqueous phase are each very rapid relative to the polymerization rate, the organic and aqueous phases tend to emulsify and a fine powder of porous polymer particles which exhibit a relatively low specific surface area, e.g. a BET surface area less than about 25 m²/g, is formed.

It is believed that use of the diffusion barrier means of the present invention in the manner herein described slows migration of the phase extender from the organic phase droplets into the aqueous phase and reduces the tendency of the surfactant to become associated with the aqueous phase to thereby shift the balance toward formation of particles having a high surface area.

The process of the present invention allows production of porous polymeric particles having high surface area by suspension polymerization techniques using a water soluble phase extender. The method avoids the clean-up problems associated with the use of organic phase extenders, i.e., the difficult tasks of removing of the organic phase extender from the particles and reclaiming the organic phase extender.

We claim:

1. A process for making porous polymeric particles, comprising:
suspending a discontinuous organic phase in a continuous aqueous phase;
said organic phase comprising:
an ethylenically unsaturated monomer;
a water soluble phase extender selected from the group consisting of water, methanol, ethanol, n-propanol, 2-propanol, tert-butanol and acetone; and
a surfactant in an amount effective to solubilize the water soluble phase extender in the monomer; and
said aqueous phase comprising diffusion barrier means dispersed in the aqueous phase, for limiting mass transfer of the phase extender from the organic phase to the aqueous phase; and
polymerizing the ethylenically unsaturated monomer to form the porous polymer particles.

2. The process of claim 1, wherein the aqueous phase further comprises anti-emulsion means, dissolved in said aqueous phase, for limiting interaction between the surfactant and the continuous aqueous phase.

3. The process of claim 1, wherein the ethylenically unsaturated monomer is selected from the group consisting of monoethylenically unsaturated monomers, polyethylenically unsaturated monomers and mixtures thereof.

4. The process of claim 3, wherein the ethylenically unsaturated monomer comprises a mixture of about 5 parts by weight to about 50 parts by weight of a monoethylenically unsaturated monomer and about 100 parts by weight of a polyethylenically unsaturated monomer.

5. The process of claim 4, wherein the monoethylenically unsaturated monomer is selected from the group consisting of styrene, ethyl vinyl benzene and mixtures thereof and the polyethylenically unsaturated monomer comprises divinyl benzene.

6. The process of claim 1, wherein the organic phase further comprises an effective amount of a polymerization initiator.

7. The process of claim 6, wherein the polymerization initiator is benzoyl peroxide 8. A process for making porous polymeric particles, comprising:
suspending a discontinuous organic phase in a continuous aqueous phase;
said organic phase comprising:
an ethylenically unsaturated monomer;
a water soluble phase extender; and
a surfactant in an amount effective to solubilize the water soluble phase extender in the monomer; and
said aqueous phase comprising diffusion barrier means dispersed in the aqueous phase, for limiting mass transfer of the phase extender from the organic phase to the aqueous phase; and
polymerizing the ethylenically unsaturated monomer to form the porous polymer particles.
wherein the water soluble phase extender is water.

9. The process of claim 1, wherein the organic phase includes from about 5 parts by weight to about 50 parts by weight water soluble phase extender per 100 parts by weight ethylenically unsaturated monomer.

10. The process of claim 1, wherein the surfactant is selected from the group consisting of sodium dialkylsuccinates and polymeric phosphate esters.

11. The process of claim 10, wherein the sodium dialkylsuccinate comprises sodium dioctylsuccinate.

12. The process of claim 10, wherein the polymeric phosphate ester comprises an octylphenoxypolyethoxyethylphosphate.

13. The process of claim 1, wherein the organic phase includes from about 10 parts by weight to about 40 parts by weight surfactant per 100 parts by weight ethylenically unsaturated monomer.

14. The process of claim 1, wherein the combined organic and aqueous phases comprise from about 0.25 parts by volume to about 1.3 parts by volume organic phase to 1 part by volume aqueous phase.

15. The process of claim 1, wherein the ethylenically unsaturated monomer is polymerized by heating the aqueous phase and suspended organic phase.

16. The process of claim 1, wherein the organic phase is maintained in suspension by agitating the aqueous phase and suspended organic phase.

17. The process of claim 1, further comprising: separating the polymeric particles from the aqueous phase; and removing the water and surfactant from the polymeric particles to provide dry porous polymeric particles.

18. The process of claim 1, further comprising functionalizing the porous polymeric particles to make a particulate ion exchange resin.

19. The process of claim 1, wherein the diffusion barrier means comprise a finely divided hydrophobic material.

20. The process of claim 19, wherein the diffusion barrier agent comprises particles of magnesium silicate clay.

21. The process of claim 19, wherein the diffusion barrier means comprises particles of a copolymer of styrene and divinylbenzene.

22. The process of claim 1, wherein the organic phase includes from about 0.4 weight percent to about 3 weight percent diffusion barrier agent.

23. The process of claim 2, wherein the an anti-emulsion means comprises a metal salt.

24. The process of claim 23, wherein the metal salt comprises sodium chloride.

25. The process of claim 2, wherein the aqueous phase includes up to about 40 parts by weight of the anti-emulsion agent per 100 parts by weight water.

26. The process of claim 1, wherein the porous polymeric particles exhibit a BET surface area of greater than about 50 square meters per gram.

27. The process of claim 1, wherein the porous polymeric particles exhibit a BET surface area of greater than about 200 square meters per gram.

* * * * *